United States Patent
Hamamoto et al.

(10) Patent No.: US 6,335,917 B1
(45) Date of Patent: Jan. 1, 2002

(54) REGULATION METHOD AND APPARATUS FOR ATM CELL DELAY VARIATION

(75) Inventors: Shinichi Hamamoto, Yamato; Masashi Hiraiwa; Atsuo Hatono, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/033,978

(22) Filed: Mar. 3, 1998

Related U.S. Application Data (63) Continuation of application No. 08/560,011, filed on Nov. 17, 1995, now Pat. No. 5,774,466.

(30) Foreign Application Priority Data

Nov. 28, 1994 (JP) .................................................. 6-293318

(51) Int. Cl.$^7$ ................................................. H04L 12/54
(52) U.S. Cl. ........................................... 370/230; 370/474
(58) Field of Search .................................... 370/229, 230, 370/231, 232, 233, 234, 235, 252, 253, 395, 396, 397, 398, 399, 412, 415, 417, 465, 468, 416, 428, 429; 710/29, 30, 52, 58, 60, 61

(56) References Cited

U.S. PATENT DOCUMENTS

| | | | |
|---|---|---|---|
| 5,138,440 A | * 8/1992 | Radice | 348/472 |
| 5,392,284 A | * 2/1995 | Sugiyama | 370/465 |
| 5,400,329 A | * 3/1995 | Tokura et al. | 370/232 |
| 5,442,624 A | * 8/1995 | Bonomi et al. | 370/231 |
| 5,509,007 A | * 4/1996 | Takashima et al. | 370/391 |
| 5,533,020 A | * 7/1996 | Byrn et al. | 370/395 |
| 5,533,021 A | 7/1996 | Branstad et al. | 370/517 |
| 5,537,446 A | * 7/1996 | Lakshman et al. | 375/371 |
| 5,541,919 A | 7/1996 | Yong et al. | 370/416 |
| 5,541,926 A | * 7/1996 | Saito et al. | 370/474 |
| 5,568,468 A | * 10/1996 | Ogasawara et al. | 370/230 |
| 5,570,372 A | 10/1996 | Shaffer et al. | 370/517 |
| 5,649,110 A | * 7/1997 | Ben-Nun et al. | 370/351 |
| 5,974,033 A | * 10/1999 | Kamiya et al. | 370/323 |

\* cited by examiner

*Primary Examiner*—Kwang B. Yao
(74) *Attorney, Agent, or Firm*—Antonelli, Terry, Stout & Kraus, LLP

(57) ABSTRACT

A regulation apparatus for ATM cell delay variation includes a variation regulating buffer for temporarily storing cells transferred thereto, a variation waiting timer for controlling a waiting time which extends from reception of the first cell to read-out of cells from the buffer, a read-out timer for controlling intervals at which cells are read from the buffer, a latest cell preservation memory for storing the latest cell transferred from a VPI/VCI demultiplexing unit and, a selector for selecting a cell stored in the buffer or in the memory to transfer the selected cell to a cell reproduction unit. The invention further includes a communication type discriminator for discriminating a communication type in a call set-up phase upon starting a communication and for calculating a variation waiting time in accordance with the discriminated communication type to set the calculated variation waiting time to the variation waiting timer, and a dummy cell inserting circuit for inserting the last reaching cell as a dummy cell if a cell delay time cannot be regulated by the variation waiting time in a communication of sound or moving images.

10 Claims, 11 Drawing Sheets

REGULATION METHOD AND APPARATUS FOR ATM CELL DELAY VARIATION

This is a continuation of application Ser. No. 08/560,011, filed Nov. 17, 1995 now U.S. Pat. No. 5,774,466.

BACKGROUND OF THE INVENTION

The present invention generally relates to a communication adaptor for reproducing cells received from an ATM (Asynchronous Transfer Mode) network to original information in a multiplex communications system using an ATM communication method. More particularly, the present invention relates to a regulation method and apparatus for ATM cell delay variation.

A multiplex communications system using the ATM communication method performs communications in the following manner. Information to be transferred is transformed into a fixed length short packet called a cell on the transmission side and then transmitted to an ATM network. A switch in the ATM network selects a transmission path with reference to a header in the cell, and a cell received from the ATM network is reproduced to original information on the reception side.

In the ATM communication system as mentioned above, while the transmission side transmits cells at regular intervals, the cells may collide on the network when a switch transfers them to a next transmission path so that the cells may reach the reception side at irregular intervals, thus causing a delay variation in the ATM cells. This phenomenon is called "ATM cell delay variation" in this disclosure. This is a phenomenon inherent to the ATM transmission method and is never found in an STM (Synchronous Transfer Mode) transmission method.

For regulating the ATM cell delay variation, the following method may be employed. Instead of reproducing transferred cells to original information at the same time they reach the reception side, the transferred cells are temporarily stored in a buffer memory, and after the lapse of a predetermined time from the reception of the first cell in a cell stream generated in a burst manner, the cells are read from the buffer memory at the same intervals as they have been transferred from the transmission side to reproduce original information therefrom.

Figure 12:
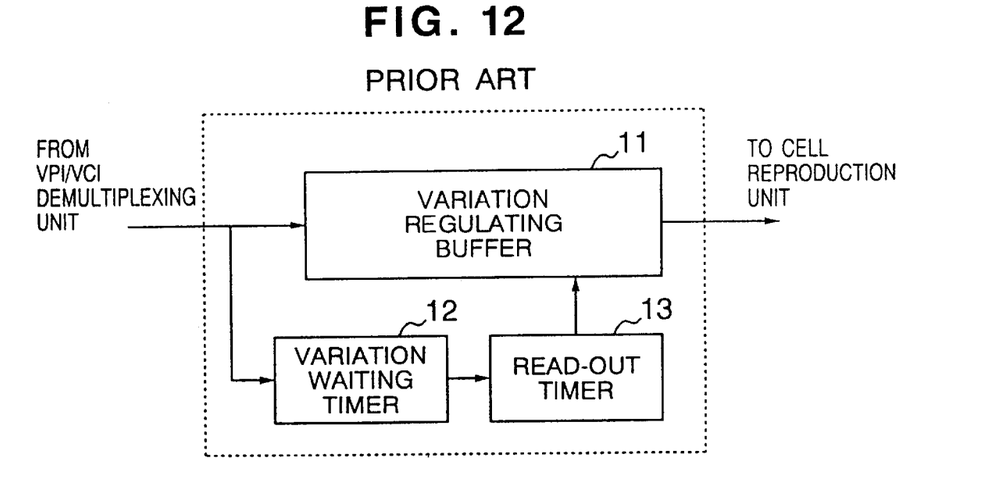
FIG. 12 is a block diagram showing the configuration of a conventional cell delay variation regulation unit.

FIG. 12 is a block diagram illustrating the configuration of an ATM cell delay variation regulation unit according to the conventional method using a buffer memory. Referring specifically to FIG. 12, the ATM cell delay variation regulation unit includes a variation regulating buffer 11, a variation waiting timer 12, and a read-out timer 13.

When the first cell in a burst is transferred from a VPI (Virtual Path Identifier)/VCI (Virtual Channel Identifier) demultiplexing unit of the ATM network to the delay variation regulation unit, the variation waiting timer 12 is started, and the first and subsequent cells are stored in the variation regulating buffer 11. After a predetermined time has elapsed, the variation waiting timer 12 starts the read-out timer 13. The cells stored in the variation regulating buffer 11 are read out at the same intervals as cell transmitting intervals on the transmission side by the read-out timer 13 and transferred to a cell reproduction unit.

Figure 13:
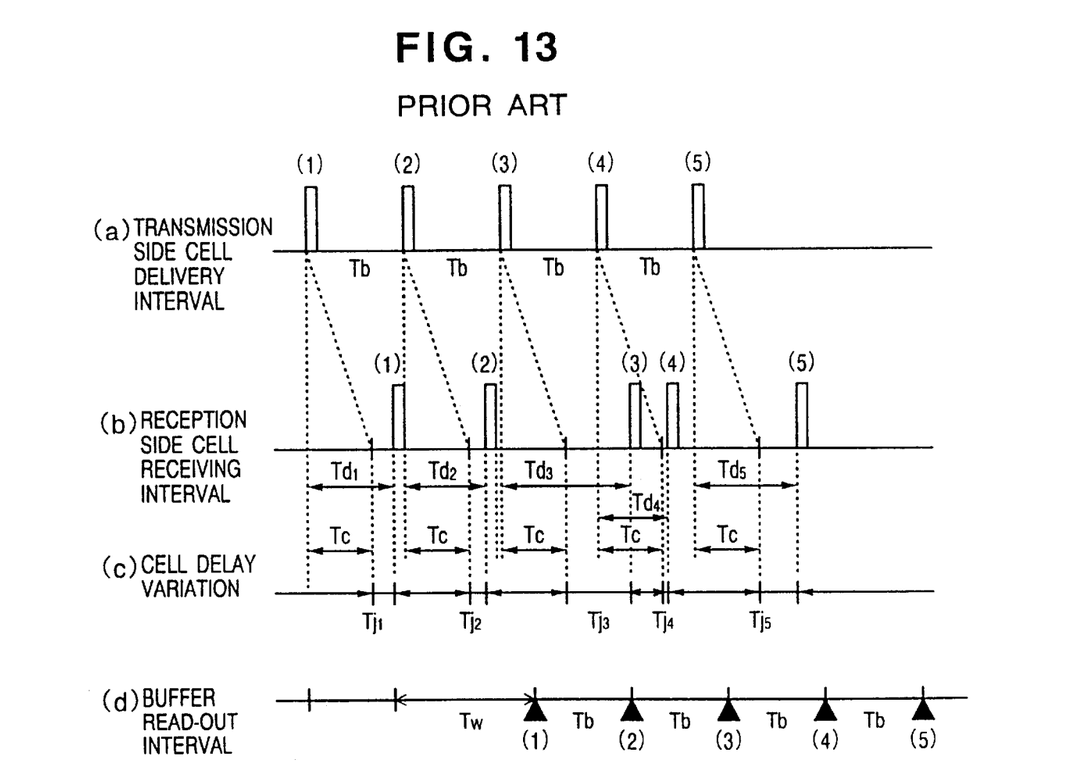
FIG. 13 is a timing chart representing the timing of cells associated with a conventional regulation method for cell delay variation.

FIG. 13 is a timing chart representing the timing of cells associated with a conventional delay variation regulation method. Referring specifically to FIG. 13, cells are delivered from the transmission side at delivery intervals Tb (a). The cells reach the cell delay variation regulation unit with a varying delay amounts Td1–Td5 which are respectively the sum of a transmission delay Tc in the ATM network and a delay in the switch in the ATM network Tj1–Tj5 (b). Among the transmission delay Tc and the delays Tj1–Tj5 forming the delay amounts Td1–Td5, the transmission delay Tc is a fixed amount, whereas the delays Tj1–Tj5 in the switch are varying amounts (c). Thus, the read-out timer 13 reads the cells stored in the variation regulating buffer 11 at intervals equal to the delivery intervals Tb after a waiting time Tw from the time the first cell in a burst reaches and is stored in the variation regulating buffer 11 in the delay variation regulation unit (d).

For the waiting time Tw which extends from the time the first cell in a burst is received to the time it is read from the buffer 11, it is thought as a common tendency to employ a maximum delay time of the cell. On the other hand, JP-A-5-83289, laid open on Apr. 2, 1993, has proposed reducing the waiting time by employing as the waiting time a value calculated by subtracting a time required to reproduce original information from a cell from the maximum delay time of the cell.

The above-mentioned cell delay regulation method fixedly uses a value based on the maximum delay time of the cell as the waiting time which extends from the time the first cell is received in the buffer to the time it is read therefrom irrespective of a type of information.

However, when the maximum delay time of the cell or a time proximal to this is used as the delay variation waiting time, communications of signals sensitive to delays such as sound, moving images, and so on suffer from problems in terms of the service quality, i.e., delayed or tedious sound, deteriorated image quality, and so on.

SUMMARY OF THE INVENTION

It is an object of the present invention to provide a regulation apparatus for ATM cell delay variation for inserting a waiting time between the reception of cells into a buffer and the read-out of the same for regulating a delay variation, which is capable of variably setting the waiting time corresponding to a communication type to achieve an appropriate communication scheme for each communication type.

Figure 1:
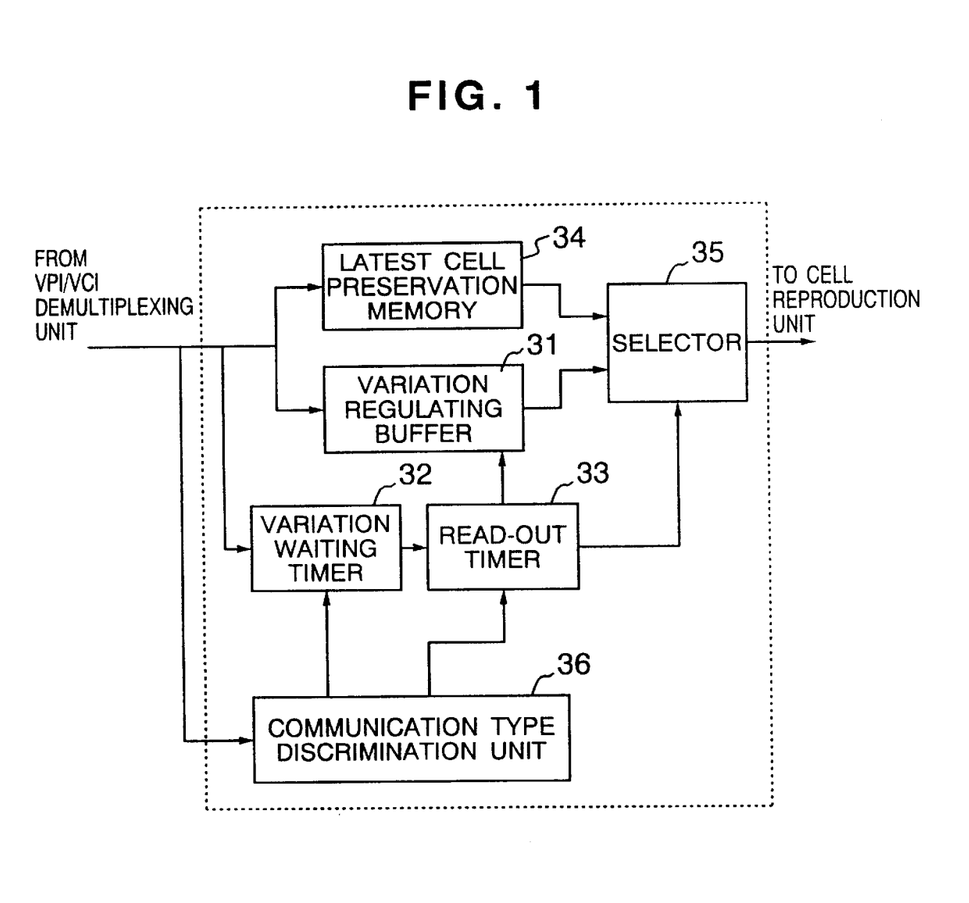
FIG. 1 is a block diagram showing the configuration of a cell delay variation regulation unit according to the present invention.

FIG. 1 is a block diagram illustrating the configuration of a cell delay variation regulation unit according to the present invention. The cell delay variation regulation unit comprises, in addition to the configuration of conventional delay variation regulation unit including a variation regulating buffer 31 for temporarily storing cells transferred from a VPI/VCI demultiplexing unit, a variation waiting timer 32 for controlling a waiting time which extends from the time the first cell in a burst is received to the time read-out of cells is started from the variation regulating buffer "31", and a read-out timer 33 for controlling intervals at which cells are read from the variation regulating buffer "31". The cell delay variation regulation unit further comprises a latest cell preservation memory 34 for storing the latest cell transferred from the VPI/VCI demultiplexing unit, and a selector for selecting which of the variation regulating buffer 31 and the latest cell preservation memory 34 a cell is read from to be transferred to a cell reproduction unit.

Figure 8:
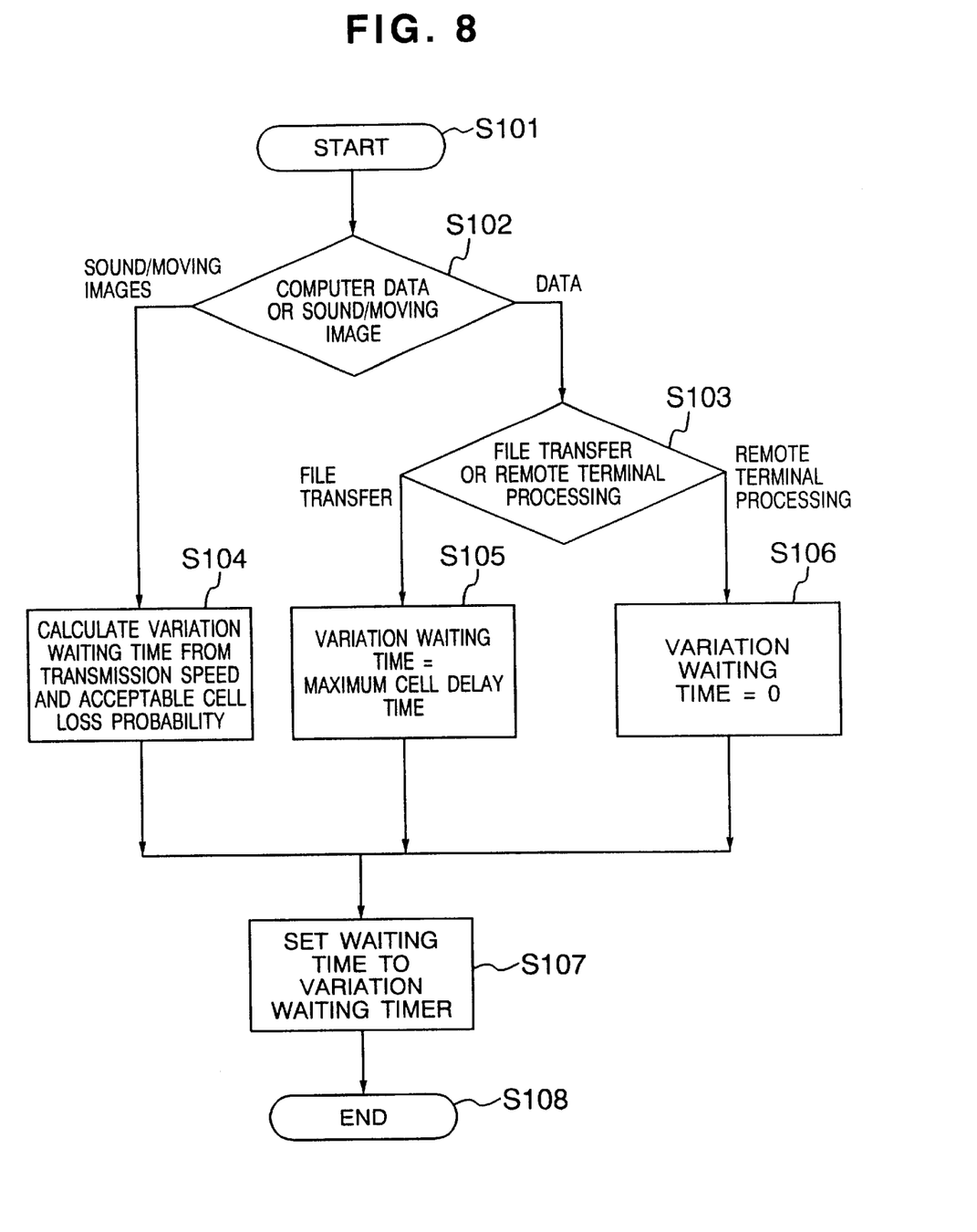
FIG. 8 is a flow chart representing a procedure for discriminating a communication type.

Also, a communication type discrimination unit 36 arranged internal or external to the cell delay variation regulation unit is provided with an information kind discrimination function for discriminating a communication type in a call set-up phase upon starting communications and for setting to the variation waiting timer 32 the waiting time which extends from the time the first cell in a burst is received to the time read-out is started from the variation regulating buffer 31 corresponding to the discriminated communication type (from steps S101 to S108 in FIG. 8).

Further, the cell delay variation regulation unit comprises a dummy cell inserting unit for inserting the last reaching cell as a dummy cell when the variation waiting time fails to regulate a cell delay time in a communication of sound or moving images (provided by the latest cell preservation memory 34 and the selector 35).

According to the present invention, the communication type discrimination function discriminates, in a call set-up phase upon starting a communication, whether the communication to be performed is associated with sound, moving images or the like which are largely affected by delayed cells, with a file transfer or the like which is largely affected by lost cells but not affected so much by delayed cells, or with remote terminal processing or the like which is largely affected both by delayed cells and by lost cells. The communication type discrimination function also calculates a variation waiting time in accordance with the communication type based on the result of the discrimination, and sets the calculated variation waiting time to the variation waiting timer 32, so that an appropriate communication quality can be provided for each communication type.

Also, since the dummy cell inserting unit can insert the last reaching cell as a dummy cell, when the variation waiting time fails to regulate a cell delay time in a communication of sound, moving images, or the like, to prevent interrupted sound or moving image information, deterioration of the quality can be minimized.

DESCRIPTION OF THE PREFERRED EMBODIMENTS

Figure 2:
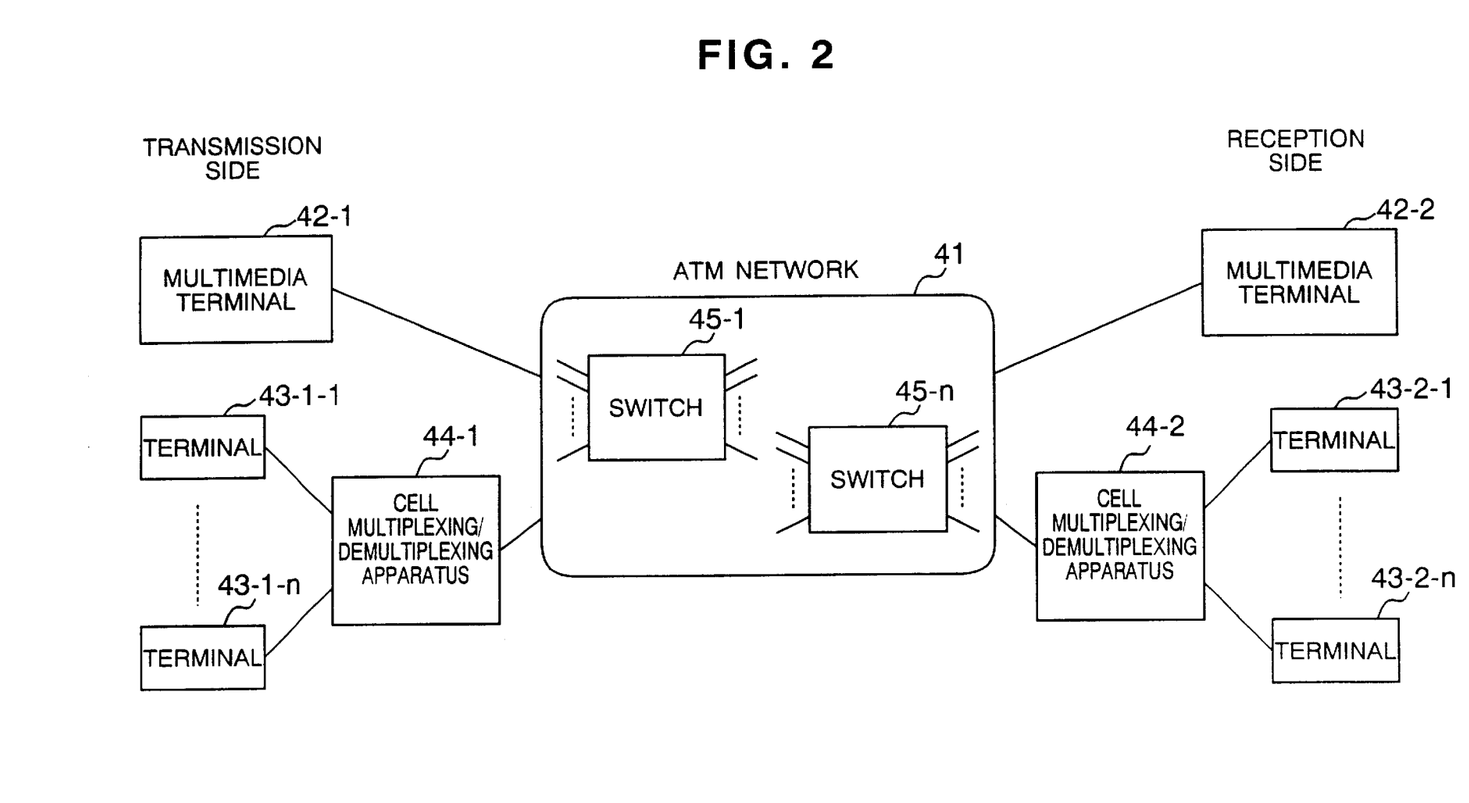
FIG. 2 is a block diagram showing the configuration of an ATM multiplex communications system to which the present invention is applied.

The present invention will hereinafter be described in connection with preferred embodiments thereof with reference to the accompanying drawings. FIG. 2 shows an exemplary configuration of an ATM multiplex communications system to which the present invention is applied. Referring specifically to FIG. 2, an ATM network 41 includes multimedia terminals 42, and ordinary terminals 43 connected to a cell multiplexing/demultiplexing apparatus 44.

The ATM network 41, including a plurality of switches 45 and transmission paths (not shown) for connecting these switches 45, serves to direct cells transferred from an apparatus connected to the network to another apparatus.

Each of the multimedia terminals 42, which is capable of per se transforming information to be transmitted into cells, multiplexing the cells, demultiplexing received multiplexed cells, and reproducing information, is directly connected to the ATM-network 41.

Each of the ordinary terminals 43, which is not capable of per se transforming information to be transmitted into cells, multiplexing the cells, demultiplexing received multiplexed cells, and reproducing information, is connected to the ATM network 41 through the associated cell multiplexing/demultiplexing apparatus 44.

The cell multiplexing/demultiplexing apparatuses 44 are each dedicated to transformation of information from the ordinary terminals 43 into cells, multiplexing of the cells, demultiplexing of multiplexed cells from the ATM network 41, and reproduction of information, and connected between associated ordinary terminals 43 and the ATM network 41.

Communications in the ATM communication system as described above will be explained giving some examples.

A first example is a communication between multimedia terminals. Information transmitted from a multimedia terminal 42-1 is transformed into cells in the terminal 42-1 itself, then multiplexed with different kinds of information generated in the same terminal 42-1, and transferred to the ATM network 41. In the ATM network 41, the cells are transferred to a multimedia terminal 42-2 through one or a plurality of switches 45. The multimedia terminal 42-2 demultiplexes the cells transferred thereto according to the kind of information to reproduce original information. The demultiplexing and reproduction are performed in the multimedia terminal 42-2 itself.

A second example is a communication between ordinary terminals. Information transmitted from an ordinary terminal 43-1 is transferred to a cell multiplexing/demultiplexing apparatus 44-1. In the cell multiplexing/demultiplexing apparatus 44-1, information transferred from the terminal 43-1 is transformed into cells, then multiplexed with cells from other ordinary terminals, and transferred to the ATM network 41. In the ATM network 41, the cells are transferred to a cell multiplexing/demultiplexing apparatus 44-2 through one or a plurality of switches 45. The cell multiplexing/demultiplexing apparatus 44-2 demultiplexes cells transferred thereto to reproduce original information, and then transfers each information to a destination terminal 43-2.

Also, a communication between different kinds of terminals, such as between a multimedia terminal 42 and an ordinary terminal 43, may be thought as another example. However, this case may be regarded as a combination of the first and second examples, so that detailed explanation of this example will be omitted.

A cell delay variation regulation unit according to the present invention is implemented in the respective multimedia terminals 42 for communications between multimedia terminals, i.e., the first example, and in the respective cell multiplexing/demultiplexing apparatuses for communications between ordinary terminals, i.e., the second example.

Figure 3:
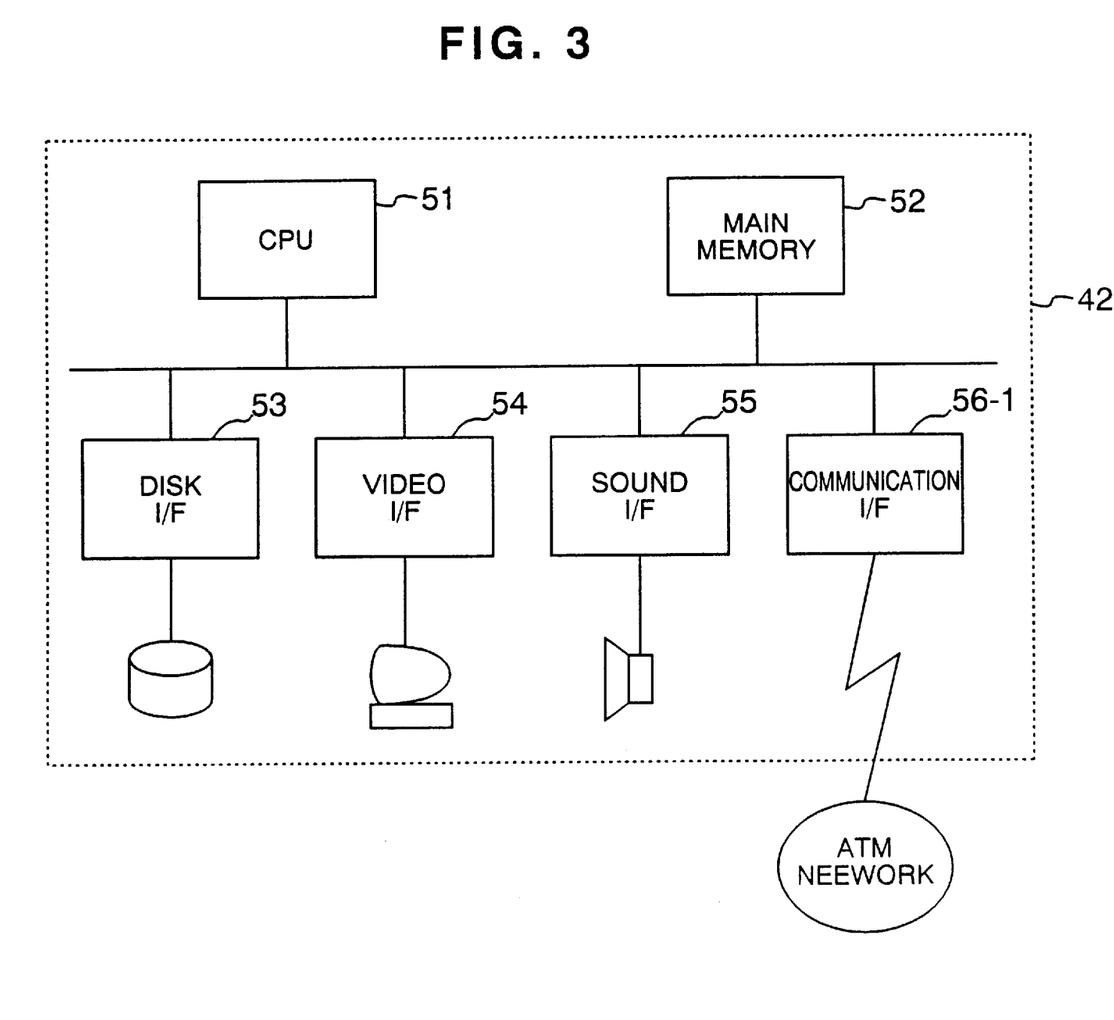
FIG. 3 is a block diagram showing the configuration of a multimedia terminal which employs a regulation method for cell delay variation according to the present invention.

FIG. 3 shows an exemplary configuration of the multimedia terminal 42 having implemented therein the cell delay variation regulation unit according to the present invention. The multimedia terminal 42 comprises a CPU 51, a main memory 52, a disk interface ("interface" is hereinafter abbreviated as "I/F") 53, a video I/F 54, a sound I/F 55, and a communication I/F 56-1. The respective units are connected to each other through a common bus such that data communications are performed between the respective units through the bus.

The CPU 51 executes each application for the multimedia terminal and controls the respective I/F units. The main memory 52 stores programs executed by the CPU 51 and data processed by the respective units.

The disk I/F 53 is connected to a disk drive unit, such that data processed by the respective units is read from and written into the disk drive unit directly or through the main memory 52 under the control of the disk I/F 53.

The video I/F 54 is connected to image input/output units such as a display, a camera, and so on, while the sound I/F 55 is connected to sound input/output units such as speakers, a microphone, and so on. These units control input/output of images and sound, respectively.

The communication I/F 56-1 is connected to the ATM network serving as communication paths to other terminals, such that communications with other terminals are controlled by the communication I/F 56-1.

Upon receiving cells from the ATM network, the communication I/F 56-1 demultiplexes multiplexed cells transferred from the ATM network with reference to a VPI/VCI number, and reproduces original information after regulating a cell delay variation. The reproduced information is transferred to the CPU 51 or to the main memory 52 and the disk I/F 53 when the information is data; to the video I/F 54 when it is image; and to the sound I/F 55 when it is sound.

Conversely, upon transmitting cells to the ATM network, the communication I/F 56-1 transforms information generated in the respective units 51–55 within the terminal into cells, multiplexes the cells with other information, and transfers them to the ATM network.

In this embodiment, the cell delay variation regulation unit has been described to be implemented in the communication I/F 56-1. Alternatively, a part or entirety of the cell delay variation regulation unit may be implemented in another location within the multimedia terminal.

Figure 4:
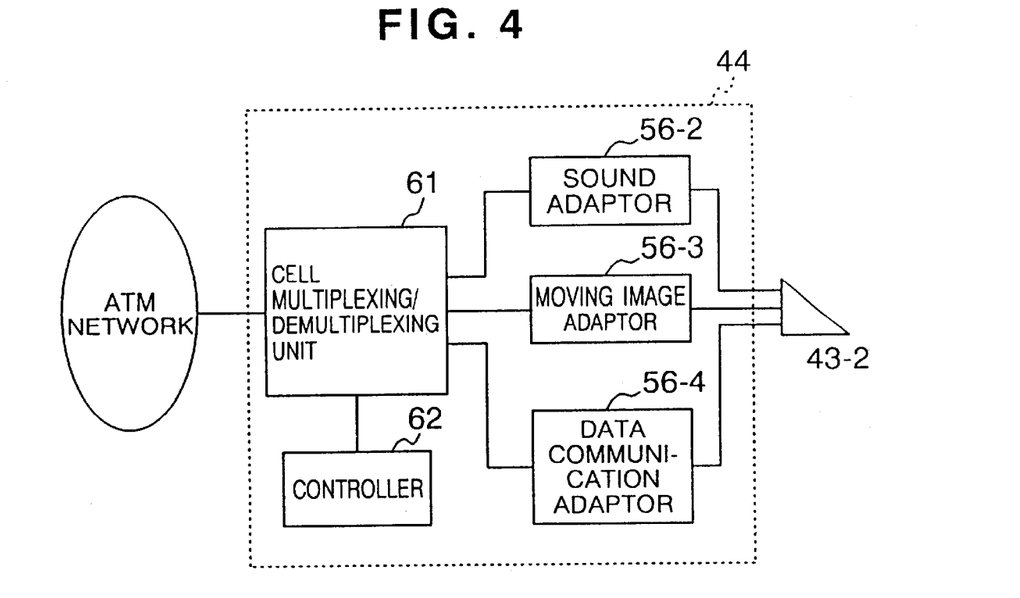
FIG. 4 is a block diagram showing the configuration of a cell multiplexing/demultiplexing apparatus which employs the regulation method for cell delay variation according to the present invention.

FIG. 4 shows an exemplary configuration of the cell multiplexing/demultiplexing apparatus 44 which employs the regulation method for cell delay variation according to the present invention. The cell multiplexing/demultiplexing apparatus 44 has a cell multiplexing/demultiplexing unit 61 and a controller 62. The cell multiplexing/demultiplexing apparatus 44 further has a sound adaptor 56-2, a moving image adaptor 56-3, and a data communication adaptor 56-4 for each terminal connected thereto. While FIG. 4 shows only one set of the terminal 43-2 and the adaptors 56-2–56-4, the cell multiplexing/demultiplexing apparatus 44 actually includes a number of such sets equal to the number of connected terminals.

The cell multiplexing/demultiplexing unit 61 is connected between the ATM network and the respective adaptors 56-2–56-4 for distributing multiplexed cells transferred thereto from the ATM network to the respective adaptors 56-2–56-4 and for multiplexing cells transferred thereto from the respective adaptors 56-2–56-4 to direct the multiplexed cells to the ATM network.

The controller 62 controls the cell multiplexing/demultiplexing unit 61 as well as the respective adaptors 56-2–56-4 through the cell multiplexing/demultiplexing unit 61.

The sound adaptor 56-2 regulates a delay variation of cells transferred thereto from the cell multiplexing/demultiplexing unit 61 and reproduces the cells as sound information which is transmitted to an associated terminal. The sound adaptor 56-2 also transforms sound information received from the associated terminal into cells which are transferred to the cell multiplexing/demultiplexing unit 61.

The moving image adaptor 56-3 regulates a delay variation of cells transferred thereto from the cell multiplexing/demultiplexing unit 61 and reproduces the cells as moving image information which is transmitted to the associated terminal. The moving image adaptor 56-3 also transforms moving image information received from the associated terminal into cells which are transferred to the cell multiplexing/demultiplexing unit 61.

The data communication adaptor 56-4 regulates a delay variation of cells transferred thereto from the cell multiplexing/demultiplexing unit 61 and reproduces the cells as data which is transmitted to the associated terminal. The data communication adaptor 56-4 also transforms data received from the associated terminal into cells which are transferred to the cell multiplexing/demultiplexing unit 61.

When receiving cells from the ATM network, the cell multiplexing/demultiplexing unit 61 distributes respective multiplexed cells transferred thereto from the ATM network to corresponding one of the adaptors 56-2–56-4 with reference to the VPI/VCI number. The respective adaptors 56-2–56-4 regulate a delay variation of cells distributed thereto and reproduce original information which is transferred to the associated terminal connected thereto.

When transmitting cells to the ATM network, respective terminals transfer information generated therein to their associated adaptors 56-2–56-4. The respective adaptors 56-2–56-4 transform information received from associated terminals into cells and transfer cells to the cell multiplexing/demultiplexing unit 61 which in turn multiplexes information transferred thereto from all the connected adaptors and transfers the multiplexed information to the ATM network.

In this embodiment, the regulation method for cell delay variation has been explained to be implemented in the respective adaptors 56-2–56-4 for the case of the cell multiplexing/demultiplexing apparatus. Alternatively, a part or entirety of the cell delay variation regulation unit may be implemented in the cell multiplexing/demultiplexing unit 61.

As described above with reference to FIGS. 3 and 4, the communication I/F 56-1 in the multimedia terminal and the adaptor units 56-2–56-4 have substantially the same basic functions and configuration. In the following, the communication I/F in the multimedia terminal and the adaptor units in the cell multiplexing/demultiplexing apparatus (including a part of the multiplexing/demultiplexing unit) are generally referred to as a "communication adaptor 56" and described with reference to the same drawings.

Figure 5:
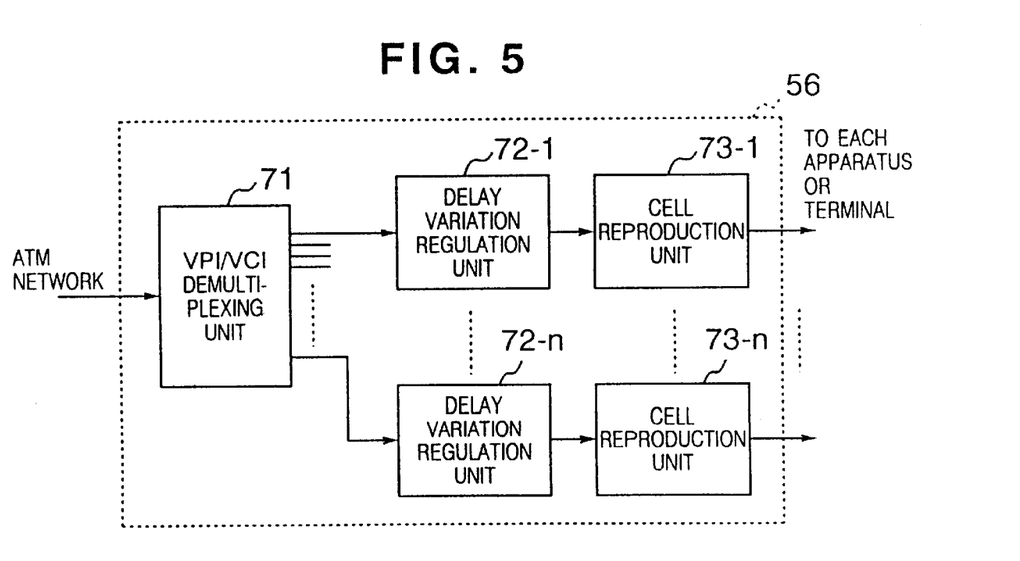
FIG. 5 is a block diagram showing the configuration of a receiver unit in a communication adaptor.

FIG. 5 shows a part of configuration associated with the reception processing extracted from the communication adaptor in the multimedia terminal and the cell multiplexing/demultiplexing apparatus. The communication adaptor 56 is composed of a VPI/VCI demultiplexing unit 71, delay variation regulation units 72, and cell reproduction units 73.

The VPI/VCI demultiplexing unit 71 is disposed between the ATM network and the delay variation regulation units 72 when used for the multimedia terminal, and within the cell multiplexing/demultiplexing unit when used for the cell multiplexing/demultiplexing apparatus, for distributing cells incoming from the ATM network to the different delay variation regulation units 72 in accordance with the VPI/VCI number with reference to a header section in each cell.

The delay variation regulation units 72 are connected between the VPI/VCI demultiplexing unit 71 and associated cell reproduction units 73 for regulating a delay time variation of cells transferred thereto from the VPI/VCI demultiplexing unit 71 to supply the delay variation regulated cells to the associated cell reproduction units 73.

The cell reproduction units 73 are connected between the associated delay variation regulation units 72 and respective units in the multimedia terminal when used for the multimedia terminal, and between the associated delay variation regulation units 72 and respective terminals when used in the cell multiplexing/demultiplexing apparatus, for reproducing sound and moving images or for reconstructing data, when cells includes data, from the cells transferred thereto from the associated delay variation regulation units 72.

Figure 6:
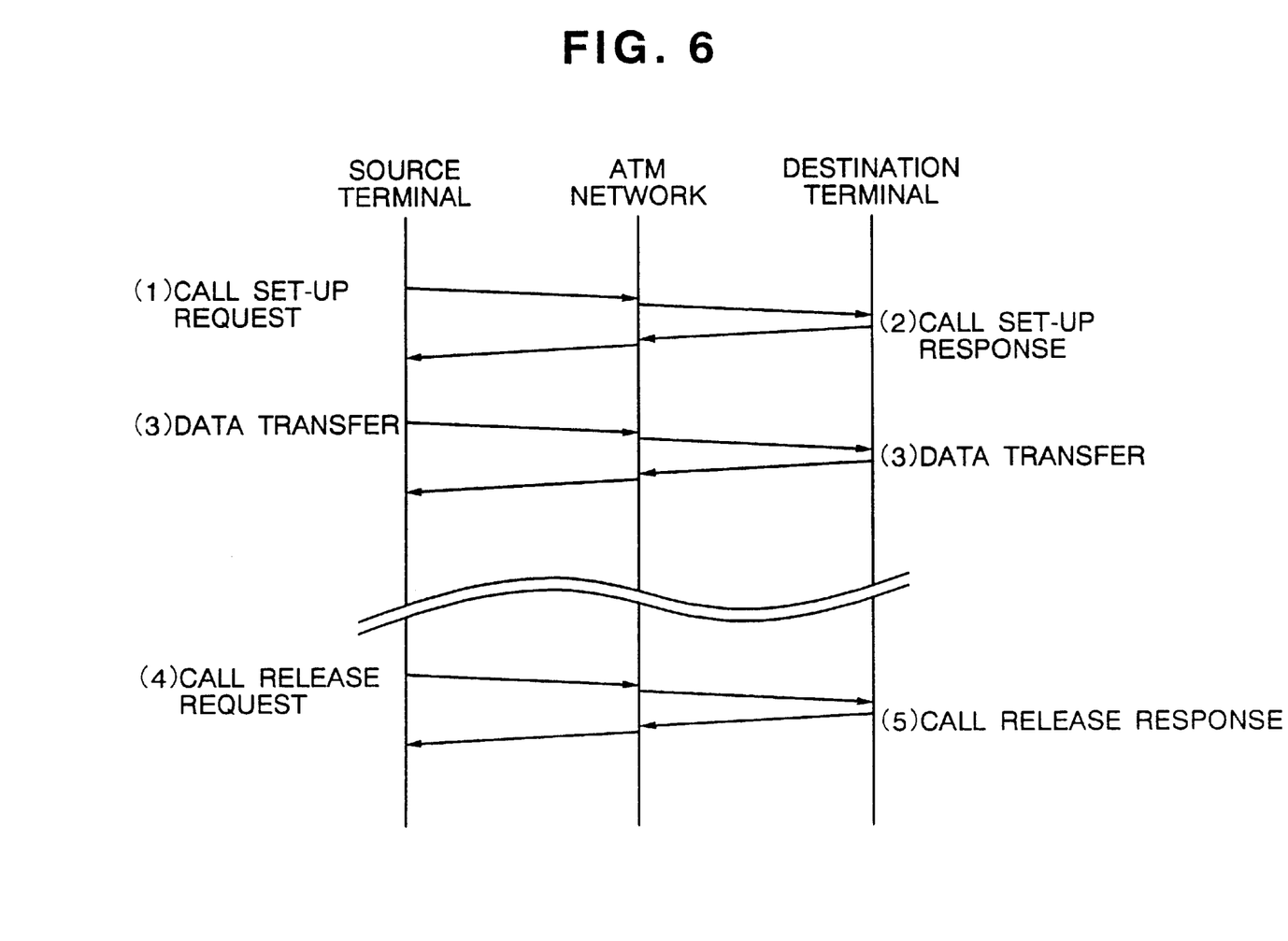
FIG. 6 is a flow diagram representing a concept of a communication procedure in an ATM communication method.

FIG. 6 shows a concept of a communication procedure between terminals in the ATM communication method. While in an actual communication, switches are disposed in the ATM network for communicating information between the switches and multimedia terminals or cell multiplexing/demultiplexing apparatus, the switches are omitted in this embodiment for simplifying the explanation.

In the ATM communication method, communications are divided into a call set-up phase, an information transfer phase, and a call release phase. Generally, a multimedia terminal sets up a plurality of calls for respective communication types, i.e., sound, image, and data. A call is identified by the VPI/VCI number. The plurality of calls are, however, set up simultaneously in accordance with a single call set-up request from a user.

A source terminal sets up a plurality of calls for respective communication types. In the call set-up phase of each call set-up, the source terminal informs a destination terminal of information including the kind and transmission speed of a communication to be performed in the information transfer phase, a required service quality therefor, and so on (1) (FIG. 6).

A destination terminal receiving the call set-up request determines in response thereto whether or not the communication is available, and returns a response to the source terminal (2).

If it is determined that the communication is available in the call set-up phase, the source terminal acquires a VPI/VCI number for the communication to be performed in the next information transfer phase.

In the information transfer phase, information is transferred under specified conditions using the VPI/VCI number acquired in the call set-up phase (3). Upon completing the transfer of the information, the next call release phase is entered.

In the call release phase, the source terminal transmits a call release request to the destination terminal (4), and the destination terminal returns a response to the call release request to the source terminal (5), whereby the used VPI/VCI is released to end the communication.

Figure 7:
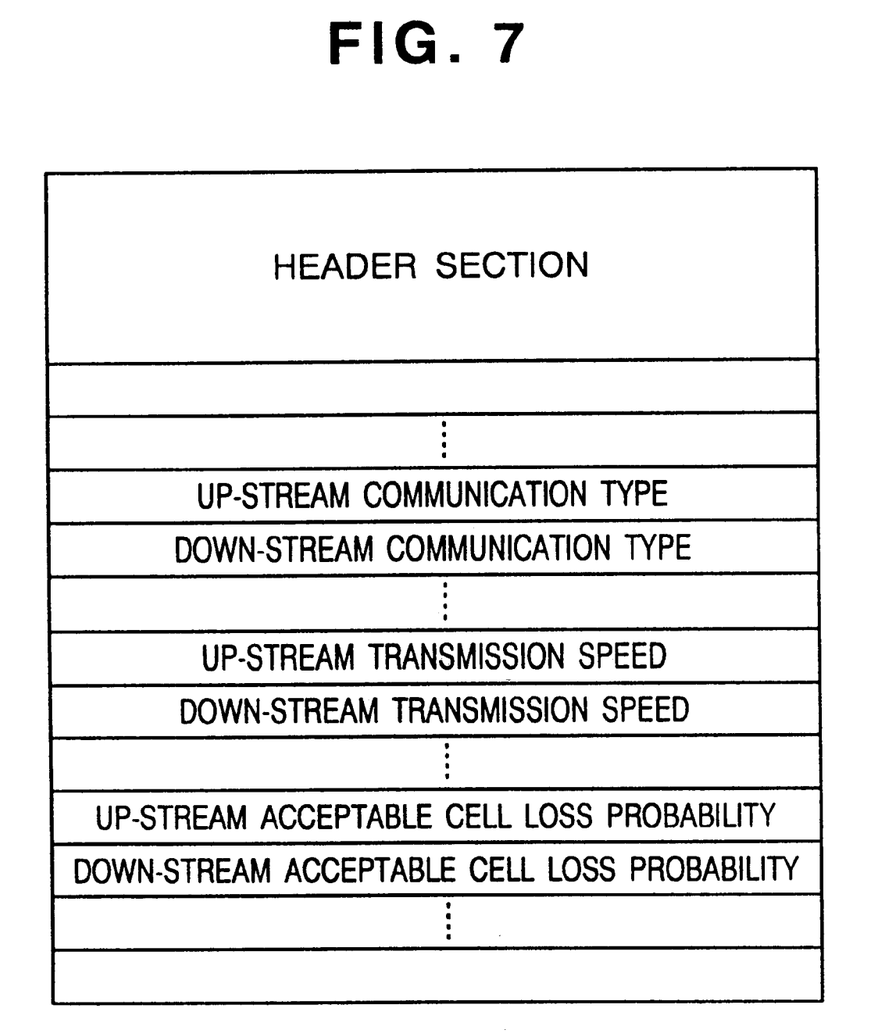
FIG. 7 shows an example of information for requesting a call set-up.

FIG. 7 shows an example of the contents of a call set-up request transmitted from a source terminal to a destination terminal in the call set-up phase. While the standardization of the call set-up request, which is made during the call set-up phase, is now in progress, and its details are not yet definite, it is assumed in this embodiment that parameters including the communication type, transmission speed, acceptable cell loss probability, and so on are passed in each communication direction, i.e., up-stream and down-stream directions. Set as communication type parameters are a parameter indicative of whether a type of a communication to be performed involves sound, moving image or data, and a parameter, which is set when the kind is a data communication, indicative of whether the communication involves a file transfer, remote terminal processing, or any other processing. Generally, the same value is set for both communication types of the up-stream and down-stream directions. When the communication type is sound or moving image, a cell delay variation waiting time may be calculated from such parameters as the transmission speed and acceptable cell loss probability.

In this embodiment, the source terminal and the destination terminal respectively acquire information such as the kind and transmission speed of communication, a requested quality, and so on, arbitrated between the terminals in each communication direction in the call set-up phase, and calculate a waiting time required to regulate a delay variation.

FIG. 8 shows an example of a procedure for discriminating a communication type. In this embodiment, the following three kinds of communications are assumed: a communication of sound, moving image, and so on which is largely affected by delays; a communication such as a file transfer or the like which does not permit lost cells but accepts delays to a certain degree; and a communication such as remote terminal processing which is largely affected by delays and do not accept any lost cells. It should be noted however that this embodiment does not limit the kinds of communications which can be handled by the present invention to the assumed three.

Referring specifically to FIG. 8, it is first determined from information acquired from a call set-up request whether the communication type parameter indicates a sound or moving image communication or a computer data communication (S102).

If the result of the determination at step S102 shows that the communication type is sound or moving images, a variation waiting time is calculated from parameters such as the transmission speed, acceptable cell loss probability, and so on (S104). A specific calculation method for the variation waiting time will be described later.

On the other hand, if the result of the determination at step S102 shows that the communication type is a computer data communication, it is further determined from the communication type parameter whether the computer data communication involves a file transfer or the like, which generates information in a burst manner, or remote terminal processing or the like which randomly generates information (S103).

If the result of the determination at step S103 shows that the communication type is a file transfer, a maximum cell delay time, which is assured by the provider of the ATM network, is used as the variation waiting time (S105). This maximum cell delay time may be previously set in a memory provided in the delay variation regulation unit or may be a parameter set when a call is set up.

On the other hand, if the result of the determination at step S103 shows that the communication type is remote terminal processing, a value of zero is used as the variation waiting time (S106). In other words, when the communication type is remote terminal processing, received cells are immediately transferred to the cell reproduction unit without inserting any waiting time.

Finally, the variation waiting time thus calculated is set to the variation waiting timer (S107).

Figure 9:
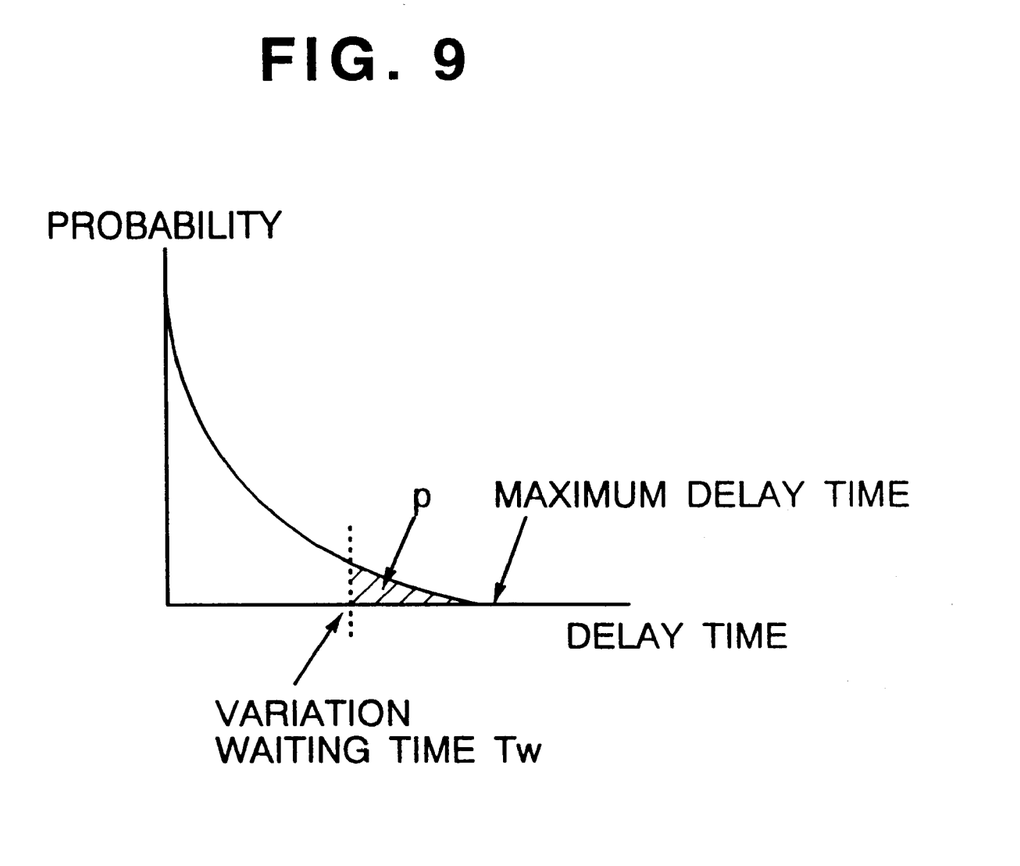
FIG. 9 is a graph showing an example of a distribution of a cell delay time.

FIG. 9 is a graph showing an example of a distribution of the cell delay time. As previously described, a delay time occurring to a cell transferred to a destination terminal varies depending on a transfer waiting time in a switch caused by a variation in traffic in the ATM network. However, the graph representing the delay time distribution shows that the delay time concentrates around a certain value depending on the characteristic of the ATM network and that a larger delay time occurs less frequently.

Incidentally, since the quality of communications for sound, moving image, and so on is largely affected by delayed cells but does not suffer so much from lost cells to some degree, a general acceptable cell loss probability has previously been determined. For example, the acceptable cell loss probability for sound is set to approximately $10^{-4}$.

From the above-mentioned fact, when the cell delay time is represented by the distribution illustrated in FIG. 9, a time Tw may be selected as a waiting time for regulating a cell delay variation, such that an area defined by the distribution curve, the delay time axis and a vertical line passing the time Tw is equal to or less than the acceptable cell loss probability.

For example, if the distribution of the cell delay time follows the Poisson distribution, the distribution of cell arrival intervals is expressed by the following equation:

$$p = \exp(-\lambda t)$$

where p is the acceptable cell loss probability, $1/\lambda$ is an average cell arrival interval, and t is a variation waiting time. In this case, the variation waiting time t is calculated by the following equation:

$$t = -\ln(p)/\lambda$$

Specific values are actually substituted into the above equation for calculating the variation waiting time t. Assuming that sound information is transmitted at a rate of 64 Kbps with the acceptable cell loss probability p equal to $10^{-4}$, and the cell reaching probability $\lambda$ equal to 166.7, the variation waiting time t is calculated to be 55.3 ms.

It should be noted that this embodiment has been described for the case where the distribution of the cell delay time follows the Poisson distribution, this is not intended to limit the type of distribution which may be used for determining the variation waiting time.

Figure 10:
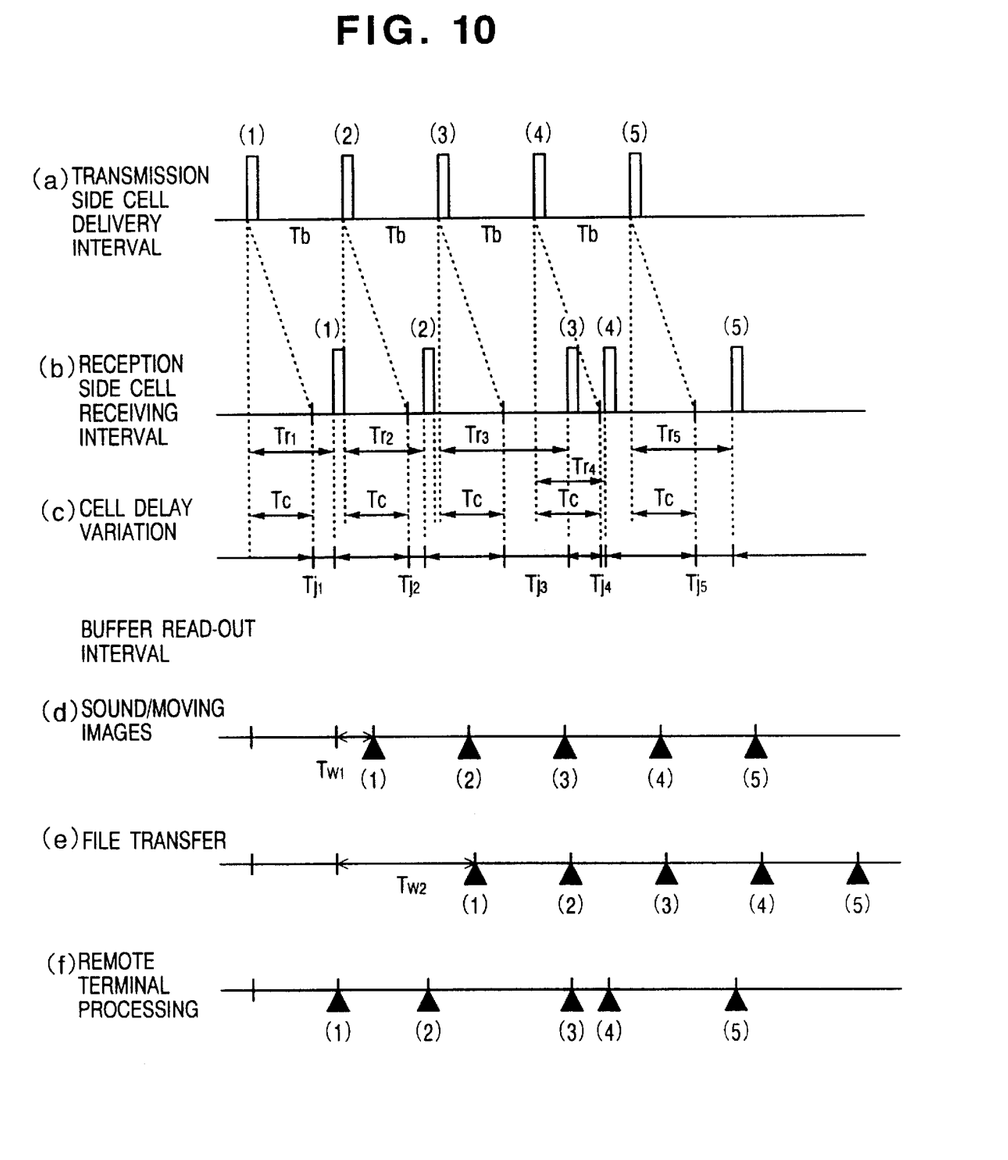
FIG. 10 is a timing chart representing the timing of cells associated with the regulation method for cell delay variation according to the present invention.

FIG. 10 is a timing chart representing the timing of cells associated with the regulation method for ATM cell delay variation according to the present invention.

Although cells are periodically delivered from a transmitting terminal at regular intervals Tb as shown in chart (a), they reaches a destination terminal through the ATM network at receiving intervals Tr1–Tr5 which are not periodic, as shown in chart (b).

A delay time occurring to each cell is the sum of a fixed transmission delay Tc and a varying delay Tj1–Tj5 due to an associated switch in the ATM network as shown in chart (c), wherein the cell delay variation results from the varying delays Tj1–Tj5.

Chart (d) represents the read-out timing for a variation waiting buffer when the communication type is sound or moving images, where a variation waiting time Tw1 is calculated by the above described method from the transmission speed and the acceptable cell loss probability. In chart (d), cells (1), (2), (4), (5) reach the destination terminal within the variation waiting time Tw1. For a cell (3) which does not reach within the variation waiting time Tw1, the cell (2), received previous to the cell (3) is inserted as a dummy cell instead of the cell (3), as will be described later. In this way, the probability of not arriving a cell within the variation waiting time can be reduced to the acceptable cell loss probability or less by the calculation of the variation waiting time. In-addition, if a cell fails to reach within the variation waiting time, the previous cell is inserted to prevent the service quality from being extremely deteriorated.

Chart (e) represents the read-out timing for the variation waiting buffer when the communication type is a file transfer, where the maximum cell delay time is used for a variation waiting time Tw2. In chart (e), all cells reach within the variation waiting time as long as no lost cell occurs in the ATM network.

Chart (f) represents the read-out timing for the variation waiting buffer when the communication type is remote terminal processing, where the variation waiting time is set to zero such that the read-out is started as soon as each cell reaches the buffer. In chart (f), all cells reaching the buffer can be delivered to the cell reproduction unit.

Figure 11:
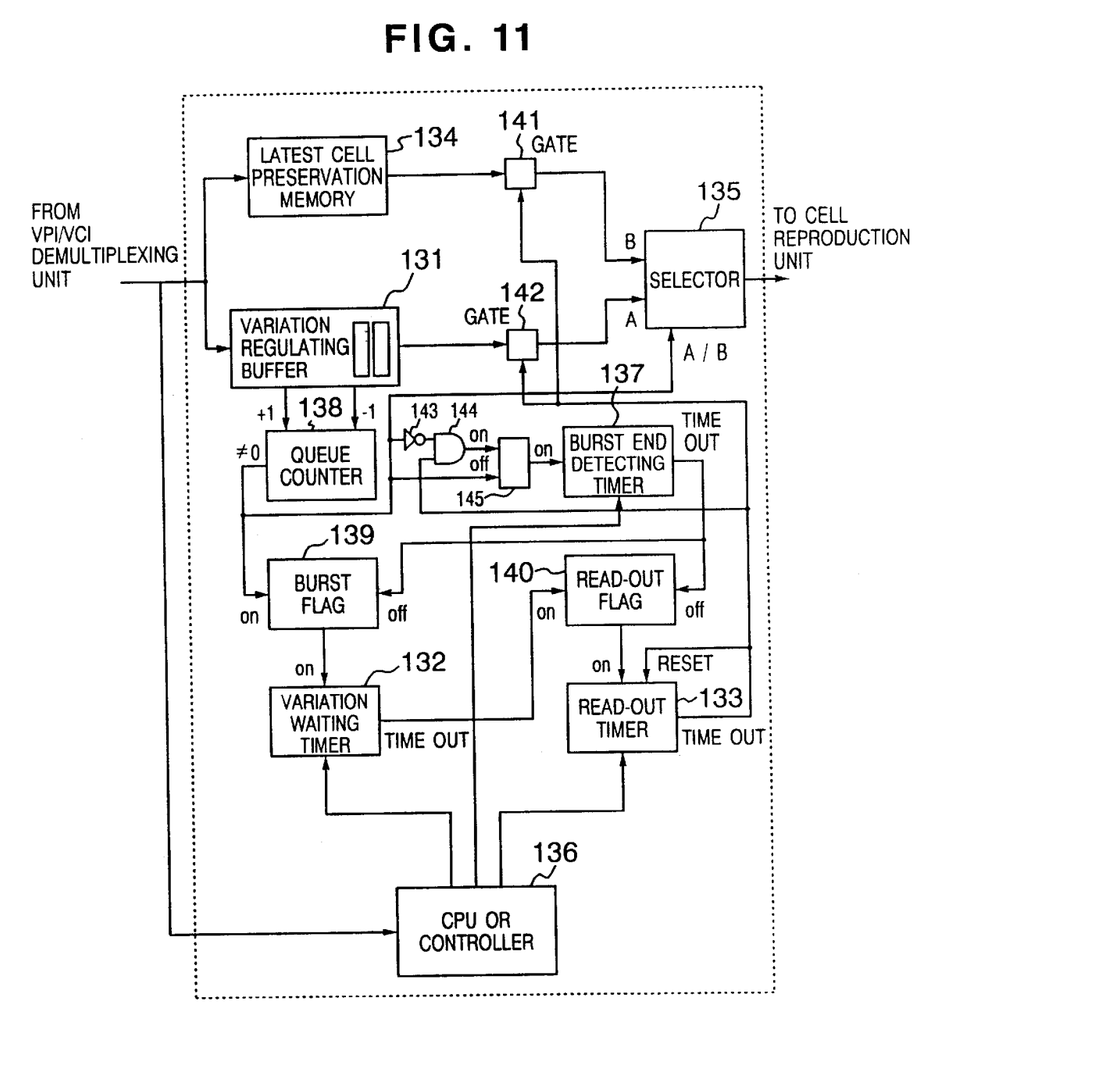
FIG. 11 is a block diagram showing the configuration of an embodiment of the delay variation regulation unit.

FIG. 11 shows an embodiment of the delay variation regulation unit according to the present invention.

The delay variation regulation unit 72 includes a variation regulating buffer 131; a variation waiting timer 132; a read-out timer 133; a latest cell preservation memory 134; a selector 135; a burst end detecting timer 137; a queue counter 138; a burst flag 139; a read-out flag 140; gates 141 and 142; a logical negation element 143; a logical AND element 144; and a burst end detecting flag 145. The delay variation regulation unit 72 also has a CPU 136. The CPU 136 may be shared with the CPU in the multimedia terminal or with the controller in the cell multiplexing/demultiplexing apparatus. The CPU or controller may be provided with an input unit and a memory for inputting and storing a variety of parameters.

The variation regulating buffer 131 temporarily stores a plurality of cells transferred from the VPI/VCI demultiplexing unit for regulating a delay variation, and transfers the cells to the cell reproduction unit after the variation waiting time has elapsed.

The variation waiting timer 132 controls the variation waiting time which is a time period which extends from the time the first cell in a burst is received by the variation regulating buffer 131 to the time the read-out of cells is started, and is started when the output of the flag 139 is turned on and stopped when it is turned off. The variation waiting timer 132 generates an output signal to turn the read-out flag 140 on when a value set by the CPU or controller 136 is reached.

The read-out timer 133 for controlling read-out intervals at which cells are read from the variation regulating buffer 131, is started when the output of the read-out flag 140 is turned on and stopped when it is turned off. The read-out timer 133 generates an output signal to open the gate 141 or 142 to read a cell from the variation regulating buffer 131 or from the latest cell preservation memory 134 as well as to reset the value set therein, when a value set by the CPU or controller 136 is reached.

The latest cell preservation memory 134 always preserves the latest cell incoming from the VPI/VCI demultiplexing unit.

The selector 135 selects which of the latest cell preservation memory 134 and the variation regulating buffer 131 a cell is read from depending on whether the value of the queue counter 138 is zero or not.

The CPU or controller 136 external to the delay variation regulation unit 72, as has been described with reference to FIGS. 6–9, identifies the communication type in the call set-up phase, and sets timer values corresponding to the identified communication type to the variation waiting timer 132, the read-out timer 133, and the burst end detecting timer 137, respectively.

The queue counter 138 is incremented by one when a cell is stored in the variation regulating buffer 131 and decremented by one when a cell is read from the buffer 131 to count the number of cells stored in the variation regulating buffer 131.

The burst end detecting timer 137, for controlling the detection of the end of a burst, is started when the output of the burst end detecting flag 145 is turned on and stopped when it is turned off. The burst end detecting timer 137 generates an output signal to turn the burst flag 139 and the read-out flag 140 off when a value set by the CPU or controller 136 is reached.

The burst flag 139 is turned on when the output of the queue counter 138 is not zero and turned off when the burst end detecting timer 137 reaches a set value, thereby indicating whether a burst is being received or not.

The read-out flag 140 is turned on when the variation waiting timer 132 reaches a set value and turned off when the burst end detecting timer 137 reaches a set value, thereby indicating whether cells are being read from the variation regulating buffer 131 or not.

The gates 141 and 142 utilize the read-out timer 133 to control the read-out of a cell from the variation regulating buffer 131 and the latest cell preservation memory 134, respectively.

The burst end detecting flag 145 is turned on when the output of the queue counter 138 is zero and the read-out timer 133 reaches a set value, and turned off when the output of the queue counter 138 is not zero, thereby indicating whether the end of a burst is being detected or not.

Next, the operation of the regulation method for delay variation according to the present invention, during a data transfer after a call set-up has been completed, will be described with reference to FIG. 11 for the case where the communication type is: (1) sound or moving images; (2) a file transfer; and (3) remote terminal processing, respectively.

(1) Sound or Moving Images

The CPU or controller 136, when determining that the communication type is sound or moving images, sets a time calculated from the transmission speed and the acceptable cell loss probability to the variation waiting timer 132 as a waiting time for regulating a cell delay variation; the same time value as a transmission side cell delivering interval to the read-out timer 133; and a time period from the time all cells are read from the variation regulating buffer 131 to the time the end of a burst is determined to the burst end detecting timer 137.

A cell distributed by the VPI/VCI demultiplexing unit is inputted to the variation regulating buffer 131 and to the latest cell preservation memory 134. As a cell is inputted to the variation regulating buffer 131, the queue counter 138 is incremented by one. Since the count value on the queue counter 138 changes from zero, the burst flag 139 is turned on.

With the burst flag 139 turned on, the variation waiting timer 132 is started. Cells will not be read from the variation regulating buffer 131 until the variation waiting timer 132 reaches a value set by the CPU or controller 136, so that cells sequentially transferred from the VPI/VCI demultiplexing unit are stored in the variation regulating buffer 131.

When the variation waiting timer 132 reaches the value set by the CPU or controller 136, the read-out flag 140 is turned on to start the read-out timer 133.

Normally, cells are read out in the following manner. The read-out timer 133 reaches a set value to open the gates 141 and 142. At this time, since the count value of the queue counter 138 is not zero, the selector 135 is switched to A-side to read a cell from the variation regulating buffer 131 and transfer it to the cell reproduction unit. As a cell is read from the variation regulating buffer 131, the queue counter 138 is decremented by one.

Since the read-out timer 133 is reset when it reaches the set value, cells are always read out at set intervals as long as the read-out flag 140 is on.

If no cell has reached the variation regulating buffer 131 when the read-out timer 131 reaches the set value, the queue counter 138 has a count value at zero, causing the selector 135 to turn to B-side to read a cell from the latest cell preservation memory 134.

If the queue counter 137 has the count value at zero when the read-out timer 133 has reached the set value, the burst end detecting flag 145 is turned on to start the burst end detecting timer 134. If a cell is transferred to the variation regulating buffer 131 while the burst end detecting timer 137 is in operation, the count value of the queue counter 137 is no longer zero, so that the burst end detecting flag 145 is turned off to stop the burst end detecting timer 137. If no cell is transferred to the variation regulating buffer 131 while the burst end detecting timer 137 is in operation, and if the burst end timer 137 finally reaches the set value, the burst flag 139 and the read-out flag 140 are turned off, whereby no cell is transferred to the cell reproduction unit until new cells are transferred from the VPI/VCI demultiplexing unit.

In summary, when the communication type is sound or moving images, if no cell reaches within the variation waiting time, a cell which has reached last is inserted as a dummy cell, regarding that cell delays varied so large that the variation waiting time was not sufficient to regulate the variation. If no cell reaches even during a predetermined time period after the variation waiting time, it is determined that a burst has ended.

(2) File Transfer

The CPU or controller 136, when determining that the communication type is a file transfer, sets a maximum cell delay time assured by the provider of the ATM network to the variation waiting timer 132 as a waiting time for cell delay variation regulation; a cycle time identical to a cell delivery interval to the read-out timer 133; and zero to the burst end detecting timer 137.

For a file transfer, in a normal cell read-out operation where cells reach the variation regulating buffer 131 during the variation waiting time, the cells are also read from the variation regulating buffer 131 in a procedure similar to that used for the above-mentioned (1) Sound or Moving Images.

If no cell has not been transferred to the variation regulating buffer 131 when the read-out timer 133 reaches the set value, the burst end detecting flag 145 is turned on to start the burst end detecting timer 137. However, since the burst end detecting timer 137 is set to zero, the burst end detecting timer 137 reaches the set value at the same time it is started to cause the burst flag 139 and the read-out flag 140 to turn off, whereby no cell is transferred to the cell reproduction unit until new cells are transferred from the VPI/VCI demultiplexing unit. In summary, when the communication type is a file transfer, if no cell reaches during the variation waiting time, it is immediately determined that a burst has ended.

(3) Remote Terminal Operation

The CPU or controller 136, when determining that the communication type is remote terminal processing, sets zero to all of the variation waiting timer 132, the read-out timer 133, and the burst end detecting timer 137.

For the remote terminal processing, the procedure from the distribution of cells from the VPI/VCI demultiplexing unit to the start of the variation waiting timer 132 is the same as that used for the above-mentioned (1) Sound or Moving Images.

Since the variation waiting timer 132 is set to zero, the read-out flag 140 is turned on to start the read-out timer 133 as soon as the variation waiting timer 132 is started. However, since the read-out timer 133 is also set to zero, cells in the variation regulating buffer 131 are transferred to the cell reproduction unit at the same time the read-out timer 133 is started.

Every time a cell is read from the variation regulating buffer 131, the queue counter 138 is decremented by one. When the count value of the queue counter 138 becomes zero, the burst end detecting flag 145 is turned on to start the burst end detecting timer 137. Since the burst end detecting timer 137 is also set to zero, the read-out flag 140 and the burst flag 139 are turned off at the same time the burst end detecting timer 137 is started, whereby no cell is transferred to the cell reproduction unit until new cells are transferred from the VPI/VCI demultiplexing unit. In summary, when the communication type is remote terminal processing, cells are transferred to the cell reproduction unit as soon as they are distributed by the VPI/VCI demultiplexing unit.

The present invention comprises the configuration and procedures as described above to acquire information such as the communication type, transmission speed, and so on from a call set-up request upon starting a communication and to calculate a waiting time for regulating a delay variation appropriate to each communication type to provide a service quality which meets requirements of each communication type.

While the above description has been made in connection with a multimedia communication method of a type which sets up a plurality of calls for respective communication types, the present invention can also be applied to the following communication method.

In the case that only one call is set up in a multimedia communication and each cell is assigned a communication type identifier, cells are distributed with reference to the communication type identifier included in each cell, in contrast with the foregoing embodiment where the VPI/VCI is used to distribute cells in accordance with the communication type. All parameters required to any communication type are set in the call set-up phase. The remaining portion of the procedure is executed similarly to the case where a plurality of calls are established, in order to calculate and set a waiting time for regulating a delay variation appropriate to each communication type.

What is claimed is:

1. A cell assembly and disassembly apparatus comprising:
   a memory being input with a plurality of cells transmitted according to the asynchronous transfer mode and storing said cells; and
   a controller outputting said cells from said memory at a predetermined transmission rate according to the synchronous transfer mode when a predetermined time lapses after said cells have been input to said memory.

2. A cell assembly and disassembly apparatus according to claim 1, wherein said controller controls the predetermined time in accordance with a type of said cells.

3. A cell assembly and disassembly apparatus according to claim 2, wherein the type of said cells is sound.

4. A cell assembly and disassembly apparatus according to claim 2, wherein the type of said cells is moving images.

5. A cell assembly and disassembly apparatus according to claim 1, wherein said controller outputs dummy cells to satisfy the predetermined transmission rate when said controller judges it impossible to output said cells at the predetermined transmission rate.

6. A cell assembly and disassembly method comprising the steps of:
   inputting a plurality of cells transmitted according to the asynchronous transfer mode and storing said cells into a memory; and
   outputting said cells from said memory at a predetermined transmission rate according to the synchronous transfer mode when a predetermined time lapses after said cells have been input to said memory.

7. A cell assembly and disassembly method according to claim 6, further comprising the step of:
   controlling the predetermined time in accordance with a type of said cells.

8. A cell assembly and disassembly method according to claim 7, wherein the type of said cells is sound.

9. A cell assembly and disassembly method according to claim 7, wherein the type of said cells is moving images.

10. A cell assembly and disassembly method according to claim 6, further comprising the step of:
    outputting dummy cells to satisfy the predetermined transmission rate when judging it impossible to output said cells at the predetermined transmission rate.

* * * * *